United States Patent
Wyatt, Jr.

(10) Patent No.: US 8,128,813 B2
(45) Date of Patent: Mar. 6, 2012

(54) SELF CLEANING SYSTEM FOR SWIM SPAS AND HOT TUBS

(75) Inventor: Douglas Robert Wyatt, Jr., Beamsville (CA)

(73) Assignee: Hydropool Industries Inc., Mississauga (CA)

( * ) Notice: Subject to any disclaimer, the term of this patent is extended or adjusted under 35 U.S.C. 154(b) by 304 days.

(21) Appl. No.: 12/236,735

(22) Filed: Sep. 24, 2008

(65) Prior Publication Data

US 2010/0072119 A1 Mar. 25, 2010

(51) Int. Cl.
*E04H 4/12* (2006.01)

(52) U.S. Cl. .................. 210/167.1; 210/232; 210/416.2; 4/507

(58) Field of Classification Search ............... 210/167.1, 210/167.16, 232, 416.1, 416.2; 4/507
See application file for complete search history.

(56) References Cited

U.S. PATENT DOCUMENTS

| | | | | |
|---|---|---|---|---|
| 2,695,677 A * | 11/1954 | Sisk | ............................. | 210/165 |
| 3,940,807 A * | 3/1976 | Baker et al. | ....................... | 4/490 |
| 4,047,522 A * | 9/1977 | Plugge | ........................... | 601/157 |
| 4,115,878 A * | 9/1978 | Johnson et al. | .................... | 4/492 |
| 5,734,999 A * | 4/1998 | Nicholas | ............................ | 4/507 |
| 5,741,453 A * | 4/1998 | Kennedy | ....................... | 264/237 |
| 6,170,095 B1 * | 1/2001 | Zars | .................................. | 4/507 |
| 6,287,456 B1 * | 9/2001 | Fish et al. | ....................... | 210/85 |
| 6,419,840 B1 | 7/2002 | Meincke | | |
| 6,523,191 B2 * | 2/2003 | Lahay et al. | .................... | 4/541.1 |
| 6,817,043 B2 * | 11/2004 | Zars | .................................. | 4/504 |
| 6,912,739 B1 * | 7/2005 | Nowell | ............................. | 4/507 |
| 7,178,179 B2 * | 2/2007 | Barnes | ............................. | 4/507 |
| 7,203,977 B2 * | 4/2007 | Mattson et al. | ................. | 4/541.1 |
| 7,300,576 B1 | 11/2007 | Blake | | |
| 7,344,639 B1 | 3/2008 | Meincke | | |
| 2004/0134844 A1* | 7/2004 | McGrath | ....................... | 210/169 |
| 2004/0148695 A1* | 8/2004 | Fidel | .............................. | 4/541.1 |
| 2005/0198731 A1* | 9/2005 | Turpen | ............................ | 4/541.1 |

* cited by examiner

*Primary Examiner* — Fred Prince
(74) *Attorney, Agent, or Firm* — Norton Rose Canada LLP

(57) ABSTRACT

A self cleaning system for a swim spa and a hot tub including a container for holding water having a weight bearing floor and sides. A basin may be positioned in the floor of the container and is integral with the container. A perforated cover may be set into the basin. A suctioning means can be positioned in the basin under the perforated cover to allow for the suctioning of water and debris through the perforated cover.

7 Claims, 4 Drawing Sheets

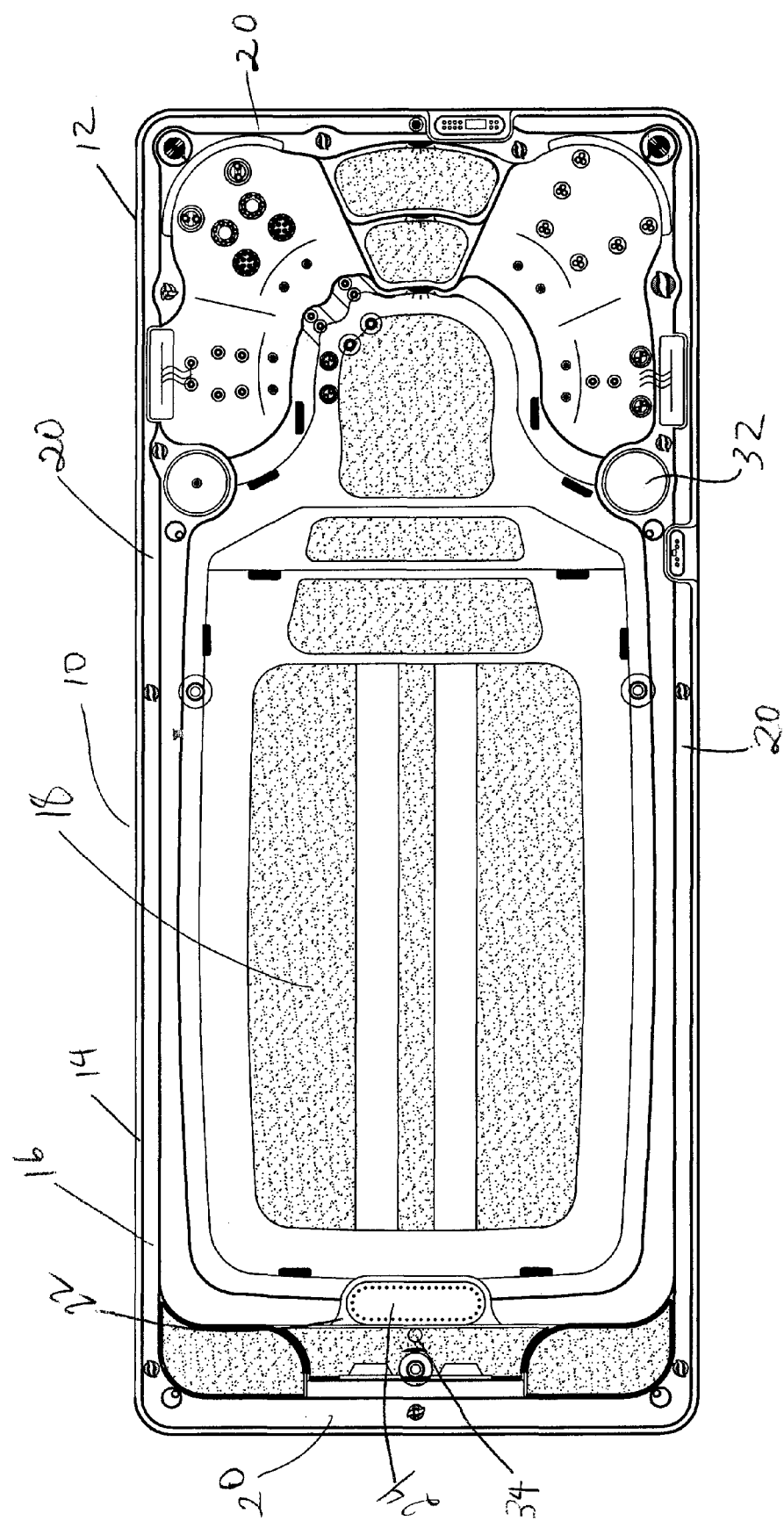

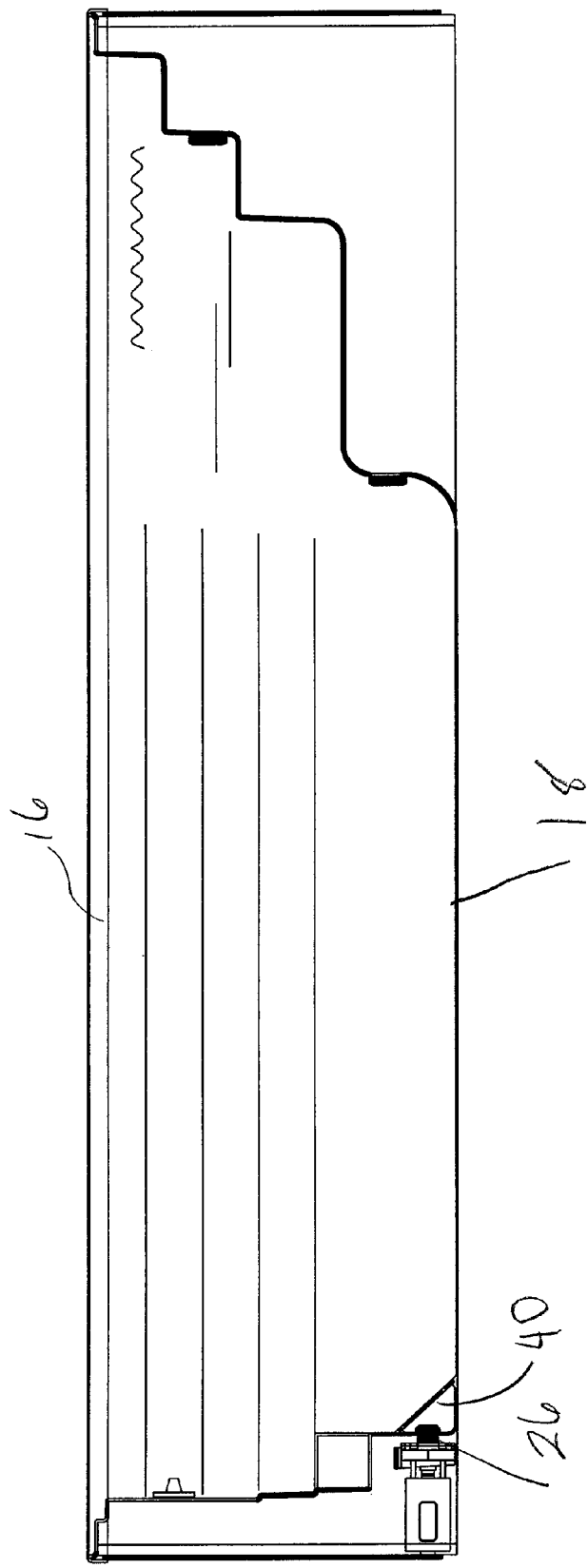

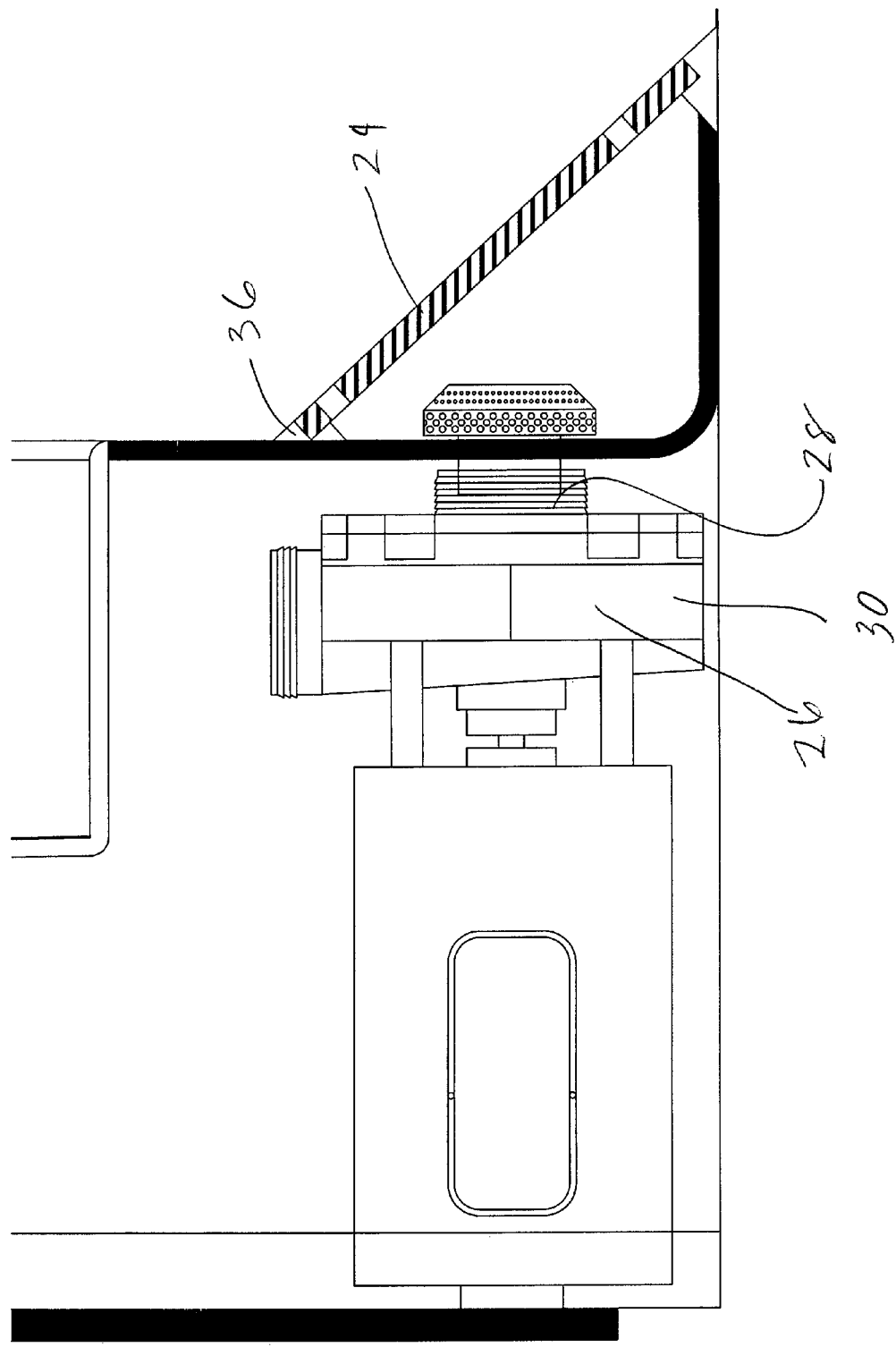

SELF CLEANING SYSTEM FOR SWIM SPAS AND HOT TUBS

FIELD OF THE INVENTION

This invention relates in general to cleaning systems for bodies of water and more particularly to a self cleaning system for swim spas and hot tubs.

BACKGROUND OF THE INVENTION

Typically the cleaning of contained bodies of water, such as those found in swimming pools is achieved by suction that attempts to remove dirt, leaves and other forms of debris. Due to the average size of swimming pools, manual cleaning is a time consuming and not particularly effective option as it requires a complicated suctioning and filtering system that is moved around the pool. Some automatic cleaning systems have included a device that automatically moves across the floor of the pool and sucks up debris. These devices or systems are often complicated and are not capable of vacuuming large sized debris.

Prior art self cleaning systems have been devised to address the noted problems. For example, U.S. Pat. No. 6,419,840 issued on Jul. 16, 2002 to Meincke and relates to a cleaning system for a swimming pool having plural active drains deployed about the bottom wall of a swimming pool and that cooperate with plural stationary nozzles mounted in the side walls that direct a flow of water down the side wall of the swimming pool. The directional nozzles dislodge debris from the side and bottom walls which is swept toward and received by the plural active floor drains, thus cleaning the pool. Additionally, the active floor drains have a grid cover that admits larger debris and does not prohibit the use of mobile pool cleaners. The active floor drains are connected to in-deck, fine mesh canister filters to remove medium and large size debris before it reaches the water pump and balance of the pool filtration system.

Blake is the owner of U.S. Pat. No. 7,300,576 which issued on Nov. 27, 2007 and relates to a swimming pool cleaning system that includes a pump, a first tube coupling a suction port of the pump in fluid communication with a main drain or mobile cleaning device which draws water and settled debris from the bottom of the pool, and a skimming device including an entrainment nozzle and a safety tube. The entrainment nozzle is coupled by a second tube to a coupling device which diverts a small portion of pool return water pumped from an outlet port of the pump. The safety tube extends from above the water line and above the debris trap in the skimmer to the body of the skimmer below the debris trap. Most of the pool return water is pumped into a rotary distribution valve, various outlets of which are connected to various pool cleaning heads embedded in an inner surface of the pool. A single low-horsepower pump produces simultaneous effective skimming and operation of embedded cleaning heads.

Finally U.S. Pat. No. 7,344,639 issued on Mar. 18, 2008 to Meincke relates to a swimming pool water circulation system that includes up to two sets of at least two active main drains connected to a "Y" or a "double Y" connector and then, via a single line, to a single canister filter. Jet nozzles arranged in at least one bank on the pool walls use return water to sweep sediment down the pool walls and to cause a vertical flow of the water above the drains. The additional main drains can be deployed closer to the pool walls where they can better intercept sediment from the jet nozzles.

Self cleaning systems for swimming pools do not however address the challenges found in cleaning the water in the hot tub or swim spa environment. Hot tubs and swim spas create a special environment for the contained water due to the structural characteristics of the spas and tubs, namely the lack of depth to the tubs, the size of the tubs and the temperature of the water.

Unlike swimming pools, hot tubs and swim spas have a much smaller volume of water contained and the depth of the tub is generally a maximum of sixty inches. As such, most users can stand on the floor of the hot tubs and swim spas, and still have their upper torso above water. In swimming pools however, due to the depth of the pools, users are not often able to touch the bottom of the pool in the deep end. Typically filtering systems or grates are located in the deep end as gravity moves the debris to the lowest point of the swimming pool. Swimming pool users therefore are not exposed to the debris or obstacles such as grates of the filtering systems as they can not stand in the deep end.

Furthermore not only is the amount of water less than what is found in a swimming pool but the actual size of the hot tub or swim spa is much smaller than what is found in a swimming pool. The small size of the hot tub or swim spa relative to the number of people using the hot tub therefore creates a more challenging environment. Firstly the users are able to easily view and/or touch debris at the bottom of the hot tub or swim spa. Secondly with hot tubs and swim spas, there are often a number of people in a hot tub at the same time, for durations that are typically an hour so the ratio of water to people is high. In contrast, a swimming pool has a large volume of water over a large space, and typically a user will not stay in the swimming pool for long periods of time. Therefore there is not the concentration of people to water volume that you find in a hot tub or swim spa.

Furthermore the temperature of the hot tub or swim spa is also a factor to cleaning systems. The water environment of a hot tub or swim spa is very different from a swimming pool in that the water is at a much higher temperature. Coupled with the high ratio of people to water volume, the cleaning system for a hot tub must be sufficient and thorough to address the hot water environment that can produce a breeding ground for bacteria. Swimming pool water temperatures are generally a great deal colder and as such do not face the challenges of the high temperature environment in a hot tub.

The standard cleaning methods for hot tubs and swim spas and the like are usually through suctioning means similar to a swimming pool, and similar to a swimming pool, these systems do not capture all of the debris. Due to the size of the hot tubs and swim spas, and the lack of depth to their structure as noted above, the suctioning means is typically installed on a vertical wall of the hot tub or swim spa. The vertical wall positioning of the suctioning means is a result of resistance to having it on the floor of the hot tub or swim spa, as this is seen as an obstacle to users typically standing or walking in the hot tub or swim spa. Furthermore the positioning of the suctioning means on the vertical walls of the swim spa and hot tubs is an attempt to collect the majority of the debris in the water however, debris will often be located on the bottom or floor of the hot tub or swim spa. In swimming pools, the cleaning of the water may occur through an automatic built in vacuuming system that can utilize the bottom floor of the swimming pool to be able to remove the debris found at the bottom of the pool as the depth of the pool negates any concern of obstacles and the like.

Typically ninety nine percent of hot tubs pull the water through traditional filtering systems however the water that is located within approximately six to eight inches from the bottom of the hot tub or swim spa is not filtered through the traditional filtering systems. Due to gravity, it is in the six to eight inches of water that debris settles, yet this water is not cleaned and filtered through the side filtering systems and the debris therefore remains in the hot tub. The inefficiency of these types of systems often requires the end consumers to drain the water out of their hot tubs and swim spas to remove the debris or to use a portable cleaner found in the pool industry to vacuum out.

Therefore a self cleaning system for hot tubs or swim spas that allows for the suctioning means to be located in the bottom or floor of the hot tub by implementing a basin as an integral part of the hot tub shell and therefore provides improved cleaning, does not create an obstacle to users on the bottom of the floor, reduces the cost of labour significantly and provide a better quality product with a significant reduction in leaks and warranty claims is desired.

SUMMARY OF THE INVENTION

An object of one aspect of the present invention is to provide a self cleaning system for a hot tub or swim spa.

In accordance with one aspect of the present invention there is provided a self cleaning system for a swim spa and hot tub including a container for holding water having a weight bearing floor and sides. A basin may be positioned in the floor of the container and is integral with the container. A perforated cover may be set into the basin. A suctioning means can be positioned in the basin under the perforated cover to allow for the suctioning of water and debris through the perforated cover.

Conveniently, the suctioning means further include a suction filtering device having a pump for suctioning the water and debris through the perforated cover and a filter for trapping the debris and a return outlet for the water.

Preferably, the container for holding water having a weight bearing floor and sides is an acrylic shell for a hot tub or a swim spa.

In a further embodiment the suctioning means may be positioned at a point where the sides of the container and the floor meet thereby providing an angled position for the perforated cover.

Advantages of the present invention include having a self cleaning system for hot tubs and swim spas that has a basin that is integral with the hot tub floor, a perforated plate or cover that is set into the floor of the basin so as to avoid the basin and perforated plate becoming an obstacle within the hot tub or swim spa, efficient and effective suctioning or removal of debris from the floor of the hot tub or swim spa where the debris naturally collects due to gravity, reduces the chances of entrapment in the cleaning system for users and therefore increases the safety of the hot tub, easy installation of the suctioning means therefore resulting in a reduction of parts, labour, overall manufacturing costs and maintenance costs, and eliminates the need for the user to have to manually drain and clean the hot tub or swim spa due to inefficient cleaning by side mounted cleaning systems.

BRIEF DESCRIPTION OF THE DRAWINGS

A detailed description of the preferred embodiment is provided herein below by way of example only and with reference to the following drawings, in which:

FIG. 1 in a top plan view, illustrates a self cleaning system for a swim spa and hot tub in accordance with a preferred embodiment of the present invention.

FIG. 2 in a cross-sectional view, illustrates the self cleaning system for a swim spa and hot tub in accordance with a preferred embodiment of the present invention.

FIG. 3 in a cut away view, illustrates the self cleaning system of FIG. 2.

Figure 4A:
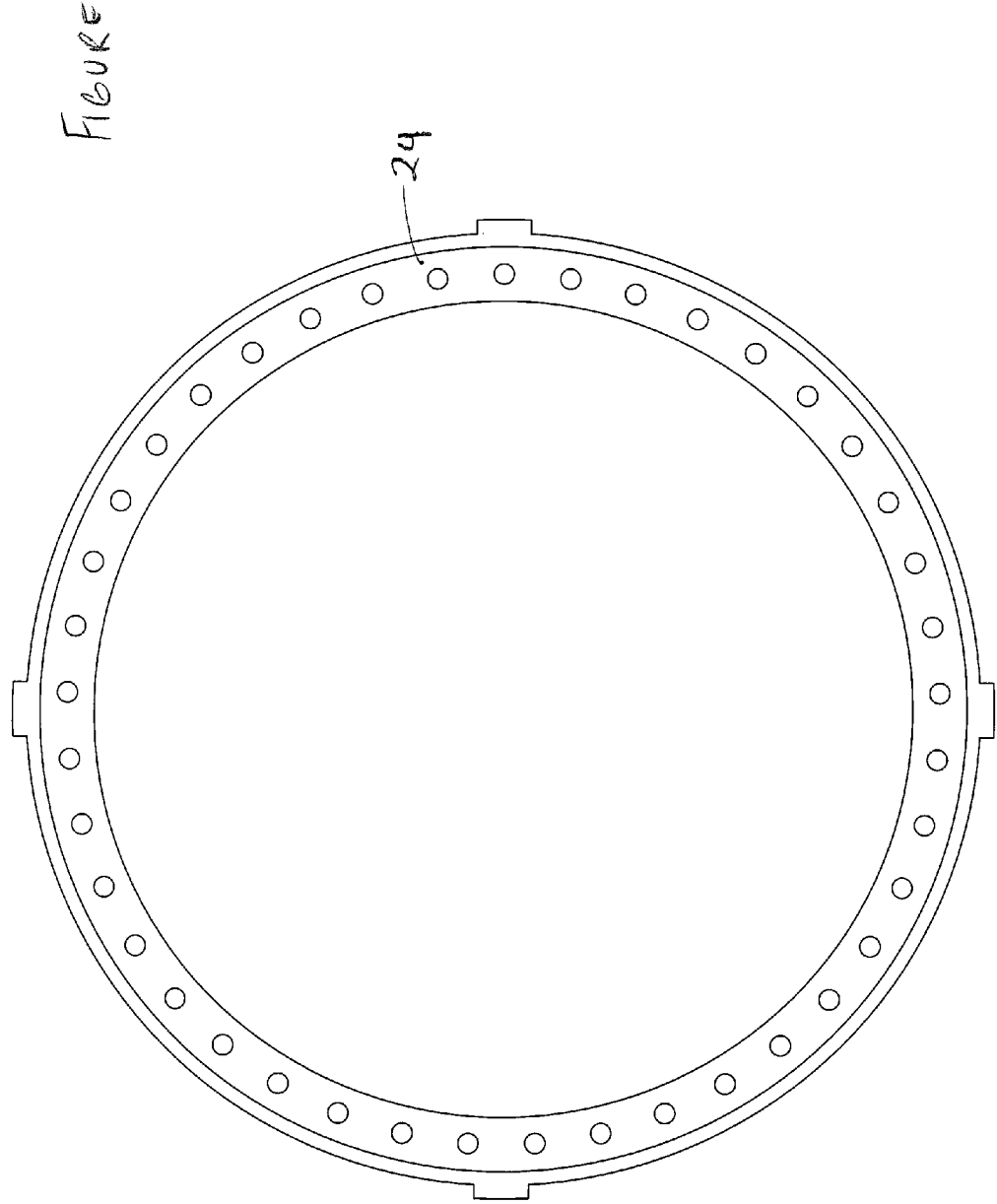
FIGS. 4a and b in top and side views, illustrates the perforated cover.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Figure 4B:
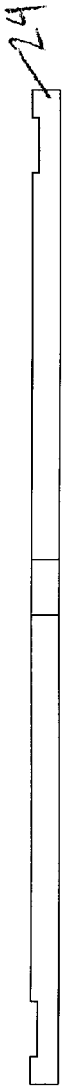

Referring to FIGS. 1 to 4b there is illustrated in a top plan and side views, a self cleaning system for a hot tub and swim spa in accordance with the preferred embodiments of the present invention. The self cleaning system 10 for a hot tub 12 and swim spa 14 includes a container 16 for holding water having a weight bearing floor 18 and sides 20. A basin 22 may be positioned in the floor 18 of the container 16 and is integral with the container 16. A perforated cover 24 may be set into the basin 22. A suctioning means 26 can be positioned in the basin 22 under the perforated cover 24 to allow for the suctioning of water and debris through the perforated cover 24.

The suctioning means 26 may further include a suction filtering device 28 having a suction pump 30 for suctioning the water and debris through the perforated cover 24 and a filter 32 for trapping the debris and a return outlet for the water 34. Specifically the suction created by the suction pump 30 allows for the water and debris in the hot tub or swim spa to be sucked through the perforated cover 24 and then the filter 32 where it is trapped. Different sized filters 32 may be used. The filtered clean water may be returned to the hot tub or swim spa via the return outlet or jet 34.

The container 16 may be further defined as an acrylic shell for a hot tub or a swim spa or both, by way of example only. Typically the acrylic shell may be vacuum formed into the desired shape with the desired features. Specifically the shape of the basin 22 is included in the vacuum forming so that the basin is integral with the container 16 or acrylic shell.

The perforated cover 24 may be secured within the basin 22 by a fastening means 36 so that the perforated cover 24 is flush with the floor 18 of the hot tub and swim spa. The fastening means 36 is a plate or cover housing 38 and screws by way of example only. Other fastening means 36 may be possible. The securing of the perforated cover 24 in the basin 22 eliminates both the basin 22 and the perforated cover 24 being an obstacle to the user of the hot tub or swim spa when they are walking across the weight bearing floor 18. Furthermore the perforated cover 24 is a clear acrylic perforated plate adapted to withstand being stood on by a user of the hot tub or swim spa.

In an alternative embodiment the basin 22 may be positioned at a point 40 where the weight bearing floor 18 and the sides 20 of the container 16 converge and is integral with the container 16. More particularly the basin 22 is positioned between the floor 18 and the sides 20 of the container 16.

Traditional self cleaning systems are not positioned on the floors of the hot tubs or swim spas and are usually located on the side of the hot tub or swim spa. As noted most hot tubs and swim spas are of a depth and design that the user will stand up in the hot tub or swim spa. As such, having a grate or drain with suction in the floor of the hot tub or swim spa is not desirable as it is seen as an obstacle that the user may trip over.

Furthermore traditional self cleaning filtering systems located on the sides of hot tubs and swim spas do not allow for the efficient and effective removal of debris and as these systems do not allow for the debris located below the side positioning of the self cleaning systems to be removed. As such although the water is filtered through the system, the water is not cleaned. As noted in the prior art, in the pool environment is a very different environment than that for a hot tub or swim spa as in a pool the drains and cleaning systems can be located at the deep end of the pool where the user does not stand. Furthermore due to the large volume of water in a pool, assistant devices such as jet directory nozzles are required to move the debris towards the grates. Furthermore the grates used in pools do not allow typical pool debris to be sucked up, and side skimmers are traditionally used for this size of debris.

In operation, the positioning of the self cleaning system 10 is more efficient as dirt and debris typically sink to the bottom of the hot tub or swim spa making the position of the instant self cleaning system in the floor an effective location. Furthermore the use of an integral basin as part of the mold of the hot tub or swim spa allows for seamless installation of the cleaning system, a reduction in parts, labour and overall manufacturing costs and reduction in maintenance costs should the self cleaning system 10 require repair. The functioning of the self cleaning system 10 may be engaged a predetermined times so that the hot tub or swim spa is cleaned a minimum amount of time. However the frequency of cleanings may be altered either by user interface or by keypad to accommodate the usage of the end user.

Furthermore a method of assembling a self cleaning system 10 for a swim spa and hot tub includes vacuum forming a container 16 for holding water having a weight bearing floor 18 and sides 20 and a basin 22 positioned within the floor of the container 16 and integral with the container 16. An aperture is then drilled in the basin 22 which is adapted to receive a suctioning means 26. A perforated cover 24 is then positioned and secured within the basin 22 allowing for the suctioning water and debris through the perforated cover 24. By having the basin 22 integral with container 16 there is a significant reductions in costs namely parts and labour but more importantly a superior product is produces that results in a significant reduction in the number of leaks as the basin 22 is integral with the container 16 and there are no seams and therefore there are less warranty claims on the final product. Installing the instant invention is also easier and less costly.

Other variations and modifications of the invention are possible. All such modifications or variations are believed to be within the sphere and scope of the invention as defined by the claims appended hereto.

The invention claimed is:

1. A self cleaning system for a swim spa and hot tub comprising:
   (a) a container for holding water having a weight bearing floor, sides and drainage basin integrally moulded into the container where the weight bearing floor and the sides of the container converge to form a corner surface;
   (b) a perforated cover set into the basin wherein the perforated cover is flush with the corner surface; and
   (c) a suctioning means positioned in the basin under the perforated cover on the for suctioning water and debris through the perforated cover.

2. A self cleaning system for a swim spa and hot tub as claimed in claim 1 wherein the suctioning means further comprises suction filtering device having a pump for suctioning the water and debris through the perforated cover and a filter for trapping the debris and a return outlet for the water.

3. A self cleaning system for a swim spa and hot tub as claimed in claim 2 wherein the container for holding water having a weight bearing floor and sides is an acrylic shell for a hot tub.

4. A self cleaning system for a swim spa and hot tub as claimed in claim 2 wherein the container for holding water having a weight bearing floor and sides is an acrylic shell for a swim spa.

5. A self cleaning system for a swim spa and hot tub as claimed in claim 2 wherein the perforated cover is secured in the basin by a fastening means.

6. A self cleaning system for a swim spa and hot tub as claimed in claim 5 wherein the fastening means is a plate housing and screws.

7. A self cleaning system for a swim spa and hot tub as claimed in claim 5 wherein the perforated cover is a clear acrylic perforated plate.

* * * * *